United States Patent
Liu

(10) Patent No.: US 11,240,775 B2
(45) Date of Patent: Feb. 1, 2022

(54) WIRELESS COMMUNICATIONS METHOD AND DEVICE

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/919,558

(22) Filed: Jul. 2, 2020

(65) Prior Publication Data
US 2020/0337014 A1 Oct. 22, 2020

Related U.S. Application Data

(63) Continuation of application No. PCT/CN2018/082571, filed on Apr. 10, 2018.

(30) Foreign Application Priority Data

Jan. 5, 2018 (WO) ................. PCT/CN2018/071630
Jan. 10, 2018 (WO) ................. PCT/CN2018/072141

(51) Int. Cl.
*H04W 4/00* (2018.01)
*H04W 60/00* (2009.01)
(Continued)

(52) U.S. Cl.
CPC ..... *H04W 60/005* (2013.01); *H04W 36/0022* (2013.01); *H04W 36/32* (2013.01);
(Continued)

(58) Field of Classification Search
CPC ............... H04W 60/005; H04W 76/15; H04W 36/0022; H04W 36/32; H04W 84/042;
(Continued)

(56) References Cited

U.S. PATENT DOCUMENTS 10,178,585 B2 * 1/2019 Huang-Fu ............. H04W 36/04
10,306,580 B1 * 5/2019 Gupta ..................... H04W 8/02
(Continued)

FOREIGN PATENT DOCUMENTS

| CN | 101282582 A | 10/2008 |
| CN | 101444066 A | 5/2009 |

(Continued)

OTHER PUBLICATIONS

Communication pursuant to Rule 164(1) EPC issued in corresponding European Application No. EP 18 89 8390, dated Feb. 4, 2021, 22 pages.
(Continued)

*Primary Examiner* — Amancio Gonzalez
(74) *Attorney, Agent, or Firm* — Bayes PLLC

(57) ABSTRACT

Embodiments of this application provide a wireless communications method and device to implement an inter-system network handover in the case of flexible registration modes of a terminal device. The method includes: determining, by a first network device in a first system, a registration mode and/or a supported registration mode of a terminal device, where the registration mode is a single registration (SR) mode of registration with a single system or a dual registration (DR) mode of registration with dual systems, and a first cell in the first system is accessed by the terminal device; and determining, by the first network device according to the registration mode and/or the supported registration mode of the terminal device, a procedure that needs to be performed or cannot be performed for the terminal device to access a second cell in a second system.

26 Claims, 6 Drawing Sheets

(51) Int. Cl.
*H04W 76/15* (2018.01)
*H04W 36/00* (2009.01)
*H04W 36/32* (2009.01)
*H04W 84/04* (2009.01)
*H04W 92/24* (2009.01)

(52) U.S. Cl.
CPC .......... *H04W 76/15* (2018.02); *H04W 84/042* (2013.01); *H04W 92/24* (2013.01)

(58) Field of Classification Search
CPC . H04W 92/24; H04W 60/04; H04W 36/0079; H04W 36/14; H04W 36/0055; H04W 36/0066; H04W 60/00; H04W 88/06
USPC .......................................................... 370/329
See application file for complete search history.

(56) References Cited

U.S. PATENT DOCUMENTS

| | | | | |
|---|---|---|---|---|
| 10,660,004 B2* | 5/2020 | Kim | .................. | H04W 36/0072 |
| 10,708,318 B2* | 7/2020 | Qiao | .................. | H04L 65/1016 |
| 10,764,779 B2* | 9/2020 | Niemi | ................. | H04W 60/005 |
| 10,869,234 B2* | 12/2020 | Velev | ................ | H04W 36/0022 |
| 10,869,244 B2* | 12/2020 | Kim | ...................... | H04W 36/34 |
| 11,019,538 B2* | 5/2021 | Stojanovski | .......... | H04W 76/50 |
| 2016/0353334 A1 | 12/2016 | Kim et al. | | |
| 2018/0376384 A1 | 12/2018 | Youn et al. | | |
| 2020/0015128 A1* | 1/2020 | Stojanovski | ...... | H04W 36/0022 |
| 2020/0059832 A1* | 2/2020 | Wang | .................... | H04W 76/25 |
| 2020/0383011 A1* | 12/2020 | Wang | ................ | H04W 36/0066 |
| 2020/0389830 A1* | 12/2020 | Park | .................. | H04W 28/0289 |

FOREIGN PATENT DOCUMENTS

| | | | |
|---|---|---|---|
| CN | 106656429 | A | 5/2017 |
| CN | 108419300 | A | 8/2018 |
| EP | 3029966 | A1 | 6/2016 |
| JP | 4391581 | B2 | 12/2009 |
| JP | 2019525690 | A | 9/2019 |
| WO | 2018006017 | A1 | 1/2018 |

OTHER PUBLICATIONS

"Procedure of inter-RAT handover with CN change", Agenda Item: 10.6.2.2, Source: Huawei, 3GPP TSG-RAN WG3 Meeting #94, R3-162953, Reno, Nevada, USA, Nov. 14-18, 2016, 3 pages.
"Handing of Single Registration without Nx Support", Agenda Item: 6.5.9, Source: China Mobile, China Unicom, CATT, SA WG2 Meeting #121, S2-1723063, May 15-19, 2017, Hangzhou, China, 3 pages.
"TS 23.501: Discussion on single registration without Nx interface", Agenda Item: 6.5.9, Source: CATT, SA WG2 Meeting #121, S2-173222, May 15-19, 2017, Hangzhou, China, 4 pages.
"3rd Generation Partnership Project; Technical Specification Group Services and System Aspects; Procedures for the 5G System; Stage 2", (Release 15), 3GPP TS 23.502 V15.1.0 3rd Generation Partnership Project (Mar. 2018), 261 pages.

International Application No. PCT/CN2018/082571, International search report, dated Sep. 4, 2018, 14 pages.
International Application No. PCT/CN2018/072141, International search report, dated Aug. 30, 2018, 12 pages.
Intel, S2-173341, "23.501: Single registration 5GC-EPC interworking with Nx holes", 3GPP TSG SA WG2 Meeting #121, May 15-19, 2017.
NTT Docomo, S2-170265, "Clarifications to interworking solutions", SA WG2 Meeting #118bis, Jan. 16-20, 2017.
MediaTek Inc., Telecom Italia, S2-175875, "pCR 23.501 5GS/EPS Interworking in SRM without N26 interface", SA WG2 Meeting #122bis, Aug. 21-25, 2017.
China Mobile, CATR, Huawei, ZTE, CATT, S2-178371, "Proposals for RRC connection release with redirection for Connected Mobility for IWK", SA WG2 Meeting #124, Nov. 27-Dec. 1, 2017.
First Examination Report issued in corresponding Chinese Application No. 202010482861.3, dated May 24, 2021, 53 pages.
Supplementary European Search Report issued in corresponding European Application No. EP 18 89 8390.2, dated Jun. 11, 2021, 24 pages.
"Procedure of inter-RAT handover with CN change", Source: Huawei, Agenda Item: 10.6.2.2., 3GPP TSG-RAN WG3 Meeting #94, R3-162953, Reno, Nevada, USA, Nov. 14-18, 2016, 3 pages.
'Interworking between NGC and EPC', NTT Docomo, S2-170934, downloaded by EPO on Feb. 13, 2017, 22 pages.
"Handing of Single Registration without Nx support", Source: China Mobile, China Unicom, CATT, Agenda: 6.5.9, SA WG2 Meeting #121, S2-1723063, May 15-19, 2017, Hangzhou, China, 3 pages.
"TS 23.501: Discussion on single registration without Nx interface", Source: CATT, Agenda item: 6.5.9, SA WG2 Meeting #121, S2-173222, May 15-19, 2017, Hangzhou, China 4 pages.
"Returning back to NR in case of handover for voice", Source: OPPO, CATR, China Telecom, China Unicom, Agenda Item: 6.5.8.2, SA WG2 Meeting #122bis, S2-176977, Oct. 23-27, 2017, Ljubljana, Slovenia, 6 pages.
3rd Generation Partnership Project; Technical Specification Group Services and System Aspects; System Architecture for the 5G System; Stage 2 (Release 15), 3GPP TS 23.501, V15.0.0 (Dec. 2017), downloaded by EPO on Dec. 22, 2017, 181 pages.
Examination report No. 2 issued in corresponding Australian Application No. 2018399714, dated Jul. 30, 2021, 5 pages.
First Examination Report issued in corresponding India Application No. 202017030329, dated Sep. 2, 2021, 5 pages.
Notice of Reasons for Refusal issued in corresponding Japanese Application No. 2020-536751, dated Sep. 7, 2021, 16 pages.
Notification of Reasons for Refusal issued in Korean Application No. 10-2020-7021483, dated Jul. 9, 2021, 8 pages.
"23.501: Single registration with no Nx interface", Agenda Item: 6.5.9 Migration and Interworking, Source: Ericsson, SA WG2 Meeting #120, S2-171756, Mar. 27-31, 2017, Busan, Korea, 5 pages.
"23.501: Single registration 5GC-EPC interworking with Nx holes", Agenda Item: 6.5.9, Source: Intel, SA WG2 Meeting #122, S2-174553, Jun. 26-30, 2017, San Jose Del Cabo, Mexico, 13 pages.
"Presentation of TS 23.501 "System Architecture for the 5G System; Stage 2 (Release 15)" v2.0.1 for approval" Agenda: 15B.1, Source SA WG2, SA WG2 Meeting #SA WG2 Meeting #124, S2-170620, Nov. 27-Dec. 1, 2017, Reno, Nevada, USA, 11 pages.

* cited by examiner

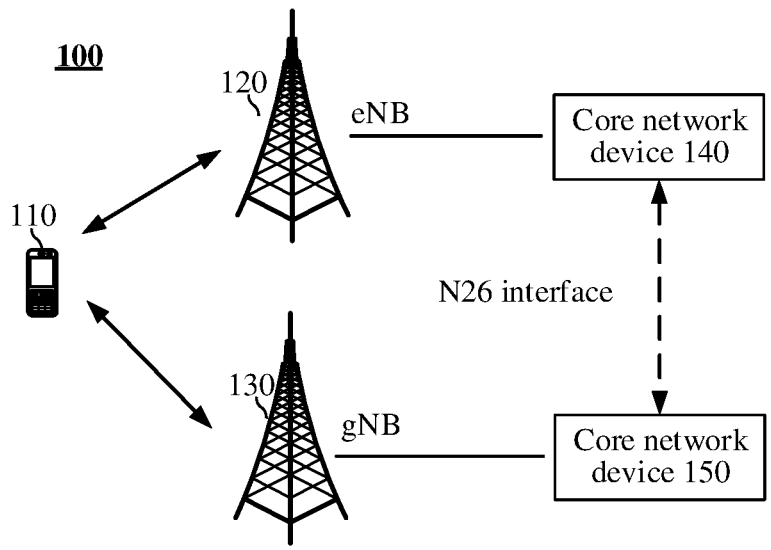

A first network device in a first system determines a registration mode and/or a supported registration mode of a terminal device, and/or the support for interoperations with an N26 interface or without an N26 interface by the first system, where the registration mode is an SR mode of registration with a single system or a DR mode of registration with dual systems, and a first cell in the first system is accessed by the terminal device — 210

The first network device determines, according to the registration mode and/or the supported registration mode of the terminal device, and/or the support for interoperations with an N26 interface or without an N26 interface by the first system, a procedure that needs to be performed or cannot be performed for the terminal device to access a second cell in a second system — 220

FIG. 2

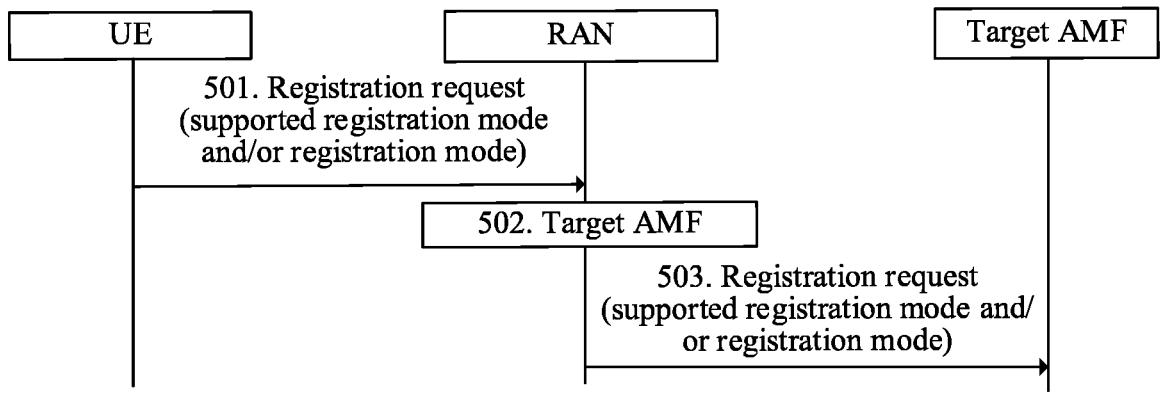

FIG. 3

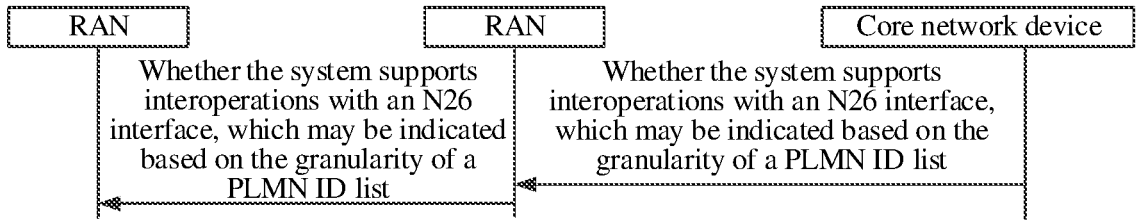

| 610 | A second network device determines at least one of a registration mode and a supported registration mode of a terminal device, the support for interoperations with an N26 interface or without an N26 interface by a first system, the support for interoperations with an N26 interface or without an N26 interface by a system corresponding to at least one PLMN, and registration of the terminal device with a second system |

| 620 | The second network device sends indication information to a first network device in the first system, where the indication information is used to indicate at least one of the registration mode and the supported registration mode of the terminal device, the support for interoperations with an N26 interface or without an N26 interface by the first system, the support for interoperations with an N26 interface or without an N26 interface by the system corresponding to at least one PLMN, and the registration of the terminal device with the second system |

| 710 | A second network device determines at least one of a registration mode and a supported registration mode of a terminal device and registration of the terminal device with a second system |

| 720 | The second network device sends indication information to a first network device in the first system, where the indication information is used to indicate at least one of the registration mode and the supported registration mode of the terminal device and the registration of the terminal device with the second system |

| 1310 | A terminal device receives indication information sent by a network device, where the indication information is used to indicate the support for interoperations with an N26 interface or without an N26 interface by a system corresponding to at least one PLMN |

| 1320 | Choose, based on the support for interoperations with an N26 interface or without an N26 interface by the system corresponding to the at least one PLMN, a PLMN for access |

| 1410: A network device obtains the support for interoperations with an N26 interface or without an N26 interface by a system corresponding to at least one PLMN |

| 1420: The network device sends indication information to a terminal device, where the indication information is used to indicate the support for interoperations with an N26 interface or without an N26 interface by the system corresponding to the at least one PLMN |

| 1510: An access network device sends a handover request message for a terminal device to a source core network device |

| 1520: The access network device receives a handover reject message sent by the core network device |

| 1530: In response to the handover reject message, the access network device triggers an RRC redirection operation for the terminal device |

FIG. 12

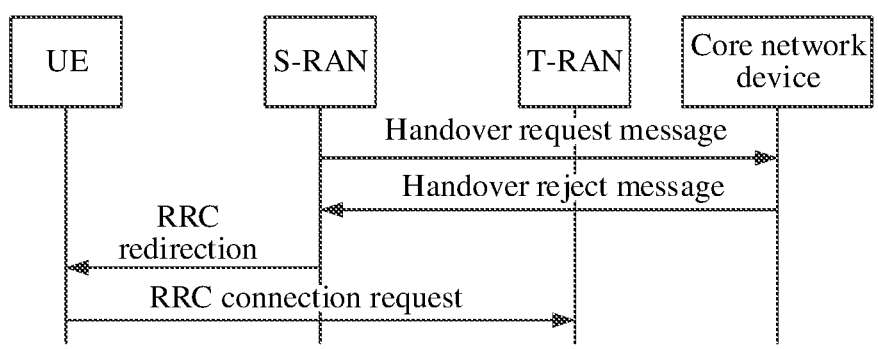

FIG. 13

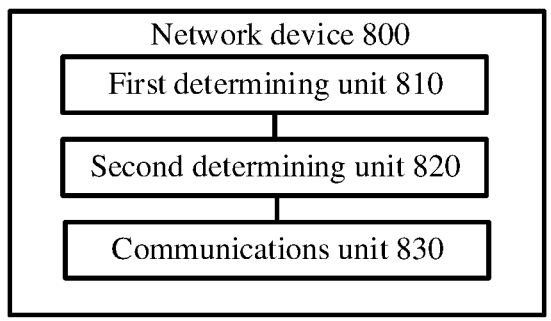

FIG. 14

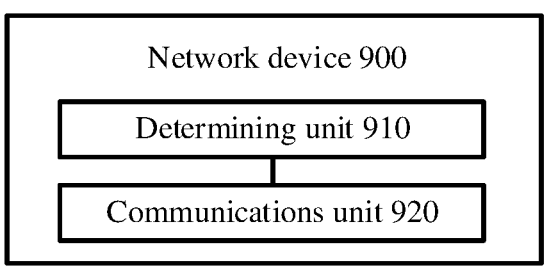

FIG. 15

WIRELESS COMMUNICATIONS METHOD AND DEVICE

CROSS-REFERENCE TO RELATED APPLICATIONS

This application is continuation of International Application No. PCT/CN2018/082571, filed on Apr. 10, 2018, which claims priorities to International Application No. PCT/CN2018/072141, filed on Jan. 10, 2018, and International Application No. PCT/CN2018/071630, filed on Jan. 5, 2018, all of which are incorporated herein by reference in their entirety.

BACKGROUND

This application relates to the field of communications, and more specifically, to a wireless communications method and device.

A terminal device may make an inter-system handover from a 5th generation (5G) core network (5GC) to an Evolved Packet Core (EPC) device after moving from a 5G New Radio (NR) network to a 4th generation (4G) Long Term Evolution (LTE) network.

In an NR system, benefiting from relatively flexible registration modes, a terminal device may register with a single system or a plurality of systems.

Therefore, how to implement an inter-system network handover in the case of flexible registration modes is a problem that needs to be resolved urgently.

SUMMARY

Embodiments of this application provide a wireless communications method and device to implement an inter-system network handover in the case of flexible registration modes of a terminal device.

A first aspect provides a wireless communications method, including determining, by a first network device in a first system, a registration mode and/or a supported registration mode of a terminal device, and/or the support for interoperations with an N26 interface or without an N26 interface by the first system, where the registration mode is a single registration (SR) mode of registration with a single system or a dual registration (DR) mode of registration with dual systems, and a first cell in the first system is accessed by the terminal device; and determining, by the first network device according to the registration mode and/or the supported registration mode of the terminal device, and/or the support for interoperations with an N26 interface or without an N26 interface by the first system, a procedure that needs to be performed or cannot be performed for the terminal device to access a second cell in a second system.

Therefore, in the embodiments of this application, in the case of an inter-system network handover, a network device may determine, based on a registration mode and/or a supported registration mode of a terminal device, a procedure that needs to be performed or cannot be performed for the terminal device to access a second cell in a second system, thereby implementing an inter-system network handover in the case of flexible registration modes.

With reference to the first aspect, in a possible implementation of the first aspect, the method further includes receiving, by the first network device, first information sent by the terminal device, where the first information is used to indicate the registration mode and/or the supported registration mode of the terminal device.

With reference to the first aspect or any possible implementation described above, in another possible implementation of the first aspect, the first information is carried in a registration message or a location update message.

With reference to the first aspect or any possible implementation described above, in another possible implementation of the first aspect, the method further includes receiving, by the first network device, second information sent by a second network device, where the second information is used to indicate the registration mode of the terminal device.

With reference to the first aspect or any possible implementation described above, in another possible implementation of the first aspect, the method further includes after the first cell is accessed by the terminal device, sending, by the first network device, a subscription notification to the second network device, where the subscription notification is used to instruct the second network device to notify the first network device after the terminal device registers with the second system, and the second information is used to indicate that the mode of the terminal device is a DR mode by indicating that the terminal device has registered with the second system.

With reference to the first aspect or any possible implementation described above, in another possible implementation of the first aspect, the sending, by the first network device, a subscription notification to the second network device includes:

if it is determined that the terminal device supports a DR mode, sending, by the first network device, the subscription notification to the second network device.

With reference to the first aspect or any possible implementation described above, in another possible implementation of the first aspect, the second network device is a network element Unified Data Management (UDM)+Home Subscriber Server (HSS).

With reference to the first aspect or any possible implementation described above, in another possible implementation of the first aspect, the method further includes receiving, by the first network device, third information sent by a third network device in the first system, where the third information is used to indicate registration of the terminal device with the second system; and the determining, by a first network device in a first system, a registration mode and/or a supported registration mode of a terminal device includes determining, by the first network device, the registration mode of the terminal device according to the registration of the terminal device with the second system.

With reference to the first aspect or any possible implementation described above, in another possible implementation of the first aspect, the first network device is an access network device in the first system, and the third network device is a core network device in the first system; and the third information is a cause value in a handover request reject message, and the third information is used to indicate that the terminal device has registered with the second system.

With reference to the first aspect or any possible implementation described above, in another possible implementation of the first aspect, the method further includes sending, by the first network device, a handover request to the third network device, where the handover request is used by the third network device to send a relocation request to a core network device in the second system through an N26 interface.

With reference to the first aspect or any possible implementation described above, in another possible implementation of the first aspect, when the registration mode of the terminal device is an SR mode, the procedure that needs to be performed is a handover procedure or a redirection procedure.

With reference to the first aspect or any possible implementation described above, in another possible implementation of the first aspect, when the terminal device keeps a connected state with the first cell, and an N26 interface is supported between the first system and the second system, the procedure that needs to be performed is a handover procedure; or when the terminal device keeps a connected state with the first cell, and the first system supports interoperations with an N26 interface, the procedure that needs to be performed is a handover procedure.

With reference to the first aspect or any possible implementation described above, in another possible implementation of the first aspect, when the terminal device keeps a connected state with the first cell, and the terminal device does not support an N26 interface, the procedure that needs to be performed is a redirection procedure; or when the terminal device keeps a connected state with the first cell, and the first system supports interoperations without an N26 interface, the procedure that needs to be performed is a redirection procedure.

With reference to the first aspect or any possible implementation described above, in another possible implementation of the first aspect, if the terminal device recognizes indication information that is sent by a network side and is used to indicate that the network side supports a handover without an N26 interface, the terminal device sends an attach request message to the network side after performing a triggered redirection procedure; or if the terminal device does not recognize or does not receive indication information that is sent by a network side and is used to indicate that the network side supports a handover without an N26 interface, the terminal device sends a location update (tracking area update, TAU) request message after performing a triggered redirection procedure.

With reference to the first aspect or any possible implementation described above, in another possible implementation of the first aspect, when the registration mode of the terminal device is an SR mode and the supported registration mode of the terminal device is a DR mode, the procedure that needs to be performed is a procedure for the terminal device to access the second cell while keeping the first cell being accessed by the terminal device.

With reference to the first aspect or any possible implementation described above, in another possible implementation of the first aspect, when the registration mode of the terminal device is a DR mode, the procedure that needs to be performed is a redirection procedure.

With reference to the first aspect or any possible implementation described above, in another possible implementation of the first aspect, the terminal device sends an attach request message to the network side after performing a triggered redirection procedure.

With reference to the first aspect or any possible implementation described above, in another possible implementation of the first aspect, an N26 interface is supported between the first system and the second system.

With reference to the first aspect or any possible implementation described above, in another possible implementation of the first aspect, when the first system supports interoperations with an N26 interface, the procedure that needs to be performed is a handover procedure.

With reference to the first aspect or any possible implementation described above, in another possible implementation of the first aspect, when the first system supports interoperations without an N26 interface and/or the registration mode of the terminal device is a DR mode, the procedure that needs to be performed is a redirection procedure.

With reference to the first aspect or any possible implementation described above, in another possible implementation of the first aspect, the first network device is a core network device.

With reference to the first aspect or any possible implementation described above, in another possible implementation of the first aspect, the method further includes receiving, by the core network device, a handover request triggered by the access network device in the first system, where the handover request is used to request to switch a cell accessed by the terminal device; and the determining, by the first network device according to the registration mode and/or the supported registration mode of the terminal device, and/or the support for interoperations with an N26 interface or without an N26 interface by the first system, a procedure that needs to be performed or cannot be performed for the terminal device to access a second cell in a second system includes in response to a handover procedure, determining, by the core network device based on the registration mode and/or the supported registration mode of the terminal device, and/or the support for interoperations with an N26 interface or without an N26 interface by the first system, the procedure that needs to be performed or cannot be performed for the terminal device to access the second cell in the second system.

With reference to the first aspect or any possible implementation described above, in another possible implementation of the first aspect, the method further includes if the core network device determines that the terminal device accesses the second cell and cannot perform a handover procedure, sending, by the core network device, a handover reject message to the access network device.

With reference to the first aspect or any possible implementation described above, in another possible implementation of the first aspect, the handover reject message carries the registration mode and the supported registration mode of the terminal device and the procedure that needs to be performed.

With reference to the first aspect or any possible implementation described above, in another possible implementation of the first aspect, the handover reject message carries a cause value of rejecting the handover request message.

With reference to the first aspect or any possible implementation described above, in another possible implementation of the first aspect, the first network device is an access network device.

With reference to the first aspect or any possible implementation described above, in another possible implementation of the first aspect, the method further includes when the procedure that needs to be performed is a handover procedure, triggering, by the access network device, a handover request message to the core network device in the first system; and when the procedure that needs to be performed is an attach procedure or a redirection procedure, triggering, by the access network device to the terminal device, the procedure for the terminal device to access the second cell while keeping the first cell being accessed by the terminal device or the redirection procedure.

With reference to the first aspect or any possible implementation described above, in another possible implementation of the first aspect, the method further includes sending, by the access network device, a handover request message to the core network device; and receiving, by the access network device, a handover reject message, where the handover reject message carries indication information, and the indication information is used to indicate that the first system supports interoperations without an N26 interface and/or the terminal device is in a DR mode.

With reference to the first aspect or any possible implementation described above, in another possible implementation of the first aspect, the support for interoperations with an N26 interface or without an N26 interface by the first system is determined by the access network device based on preset information.

With reference to the first aspect or any possible implementation described above, in another possible implementation of the first aspect, the preset information is an N2 message sent by the core network device in the first system.

With reference to the first aspect or any possible implementation described above, in another possible implementation of the first aspect, the preset information is a message returned by the core network device in the first system for a registration message of the terminal device or another terminal device.

With reference to the first aspect or any possible implementation described above, in another possible implementation of the first aspect, the preset information includes the support for interoperations with an N26 interface or without an N26 interface by a system corresponding to at least one Public Land Mobile Network (PLMN).

With reference to the first aspect or any possible implementation described above, in another possible implementation of the first aspect, the first system is a 5G system (5GS), and the second system is an LTE system; or the first system is an LTE system, and the second system is a 5GS.

A second aspect provides a wireless communications method, including determining, by a second network device, at least one of a registration mode and a supported registration mode of a terminal device, the support for interoperations with an N26 interface or without an N26 interface by a first system, the support for interoperations with an N26 interface or without an N26 interface by a system corresponding to at least one PLMN, and registration of the terminal device with a second system; and sending, by the second network device, indication information to a first network device in the first system, where the indication information is used to indicate at least one of the registration mode and the supported registration mode of the terminal device, the support for interoperations with an N26 interface or without an N26 interface by the first system, the support for interoperations with an N26 interface or without an N26 interface by the system corresponding to at least one PLMN, and the registration of the terminal device with the second system.

With reference to the second aspect, in a possible implementation of the second aspect, the determining, by a second network device, at least one of a registration mode and a supported registration mode of a terminal device and registration of the terminal device with a second system includes determining, by the second network device based on a registration message or a location update message sent by the terminal device, the at least one of the registration mode and the supported registration mode of the terminal device and the registration of the terminal device with the second system.

With reference to the second aspect or any possible implementation described above, in another possible implementation of the second aspect, the method further includes receiving, by the second network device, a subscription notification sent by the first network device, where the subscription notification is used to instruct the second network device to notify the first network device after the terminal device registers with the second system, the terminal device has registered with the first system, and the indication information is used to indicate that the mode of the terminal device is a DR mode by indicating that the terminal device has registered with the second system.

With reference to the second aspect or any possible implementation described above, in another possible implementation of the second aspect, the second network device is a network element UDM+HSS.

With reference to the second aspect or any possible implementation described above, in another possible implementation of the second aspect, the second network device is a core network device in the second system, and the first network device is a core network device in the first system; and the indication information is used to indicate that the terminal device has registered with or deregistered from the second system.

The second network device is a network element UDM+HSS.

With reference to the second aspect or any possible implementation described above, in another possible implementation of the second aspect, the second network device is a core network device in the first system, and the first network device is an access network device in the first system.

The second network device is a network element UDM+HSS.

With reference to the second aspect or any possible implementation described above, in another possible implementation of the second aspect, the method further includes receiving, by the second network device, information that is sent by the core network device in the second system and is used to indicate registration of the terminal device with the second system.

With reference to the second aspect or any possible implementation described above, in another possible implementation of the second aspect, the second network device receives a handover request message sent by the first network device; and when the first system supports interoperations without an N26 interface and/or the terminal device is in a DR mode, the second network device sends a handover reject message to the first network device, where first indication information is carried in the handover reject message, and the first indication information is used to indicate that the first system supports interoperations without an N26 interface and/or the terminal device is in a DR mode.

A third aspect provides a wireless communications method, including generating, by a terminal device, indication information, where the indication information is used to indicate a registration mode and/or a supported registration mode of the terminal device; and sending, by the terminal device, the indication information to a network device, where the indication information is used to indicate the registration mode and/or the supported registration mode of the terminal device.

With reference to the third aspect, in a possible implementation of the third aspect, the first information is carried in a registration message or a location update message.

A fourth aspect provides a wireless communications method, including receiving, by a terminal device, indication information sent by a network device, where the indication information is used to indicate the support for interoperations with an N26 interface or without an N26 interface by a system corresponding to at least one PLMN; and choosing, based on the support for interoperations with an N26 interface or without an N26 interface by at least one system corresponding to PLMN, a PLMN for access.

A fifth aspect provides a wireless communications method, including obtaining, by a network device, the support for interoperations with an N26 interface or without an N26 interface by a system corresponding to at least one PLMN; and sending, by the network device, indication information to a terminal device, where the indication information is used to indicate the support for interoperations with an N26 interface or without an N26 interface by the system corresponding to at least one PLMN.

A sixth aspect provides a wireless communications method, including sending, by an access network device, a handover request message for a terminal device to a source core network device; receiving, by the access network device, a handover reject message sent by the core network device; and in response to the handover reject message, triggering, by the access network device, a Radio Resource Control (RRC) redirection operation for the terminal device.

A seventh aspect provides a wireless communications device. The wireless communications device is configured to perform the method according to any one of any foregoing aspect or the possible implementations of any foregoing aspect. Specifically, the device includes units configured to perform the foregoing method in the first aspect or any possible implementation of the first aspect.

An eighth aspect provides a wireless communications device. The device includes a memory, a processor, an input interface, and an output interface. The memory, the processor, the input interface, and the output interface are connected by a bus system. The memory is configured to store an instruction, and the processor is configured to execute the instruction stored in the memory, to perform the method according to any one of any foregoing aspect or the possible implementations of any foregoing aspect.

A ninth aspect provides a computer storage medium. The computer storage medium is configured to store a computer software instruction that is used to perform the method according to any one of any foregoing aspect or the possible implementations of any foregoing aspect, and the computer software instruction includes a program designed to perform the foregoing aspect.

A tenth aspect provides a computer program product including an instruction, and when the computer program product is run on a computer, the computer is enabled to perform the method according to any one of any foregoing aspect or any optional implementation of any foregoing aspect.

BRIEF DESCRIPTION OF THE DRAWINGS

FIG. 1 is a schematic diagram of a wireless communications system according to an embodiment of this application.

FIG. 2 is a schematic flowchart of a wireless communications method according to an embodiment of this application.

FIG. 3 is a schematic flowchart of a wireless communications method according to an embodiment of this application.

FIG. 7 is a schematic flowchart of a wireless communications method according to an embodiment of this application.

FIG. 8 is a schematic flowchart of a wireless communications method according to an embodiment of this application.

FIG. 9 is a schematic flowchart of a wireless communications method according to an embodiment of this application.

FIG. 10 is a schematic flowchart of a wireless communications method according to an embodiment of this application.

FIG. 11 is a schematic flowchart of a wireless communications method according to an embodiment of this application.

FIG. 12 is a schematic flowchart of a wireless communications method according to an embodiment of this application.

FIG. 13 is a schematic flowchart of a wireless communications method according to an embodiment of this application.

FIG. 14 is a schematic block diagram of a network device according to an embodiment of this application.

FIG. 15 is a schematic block diagram of a network device according to an embodiment of this application.

DETAILED DESCRIPTION

Figure 4:
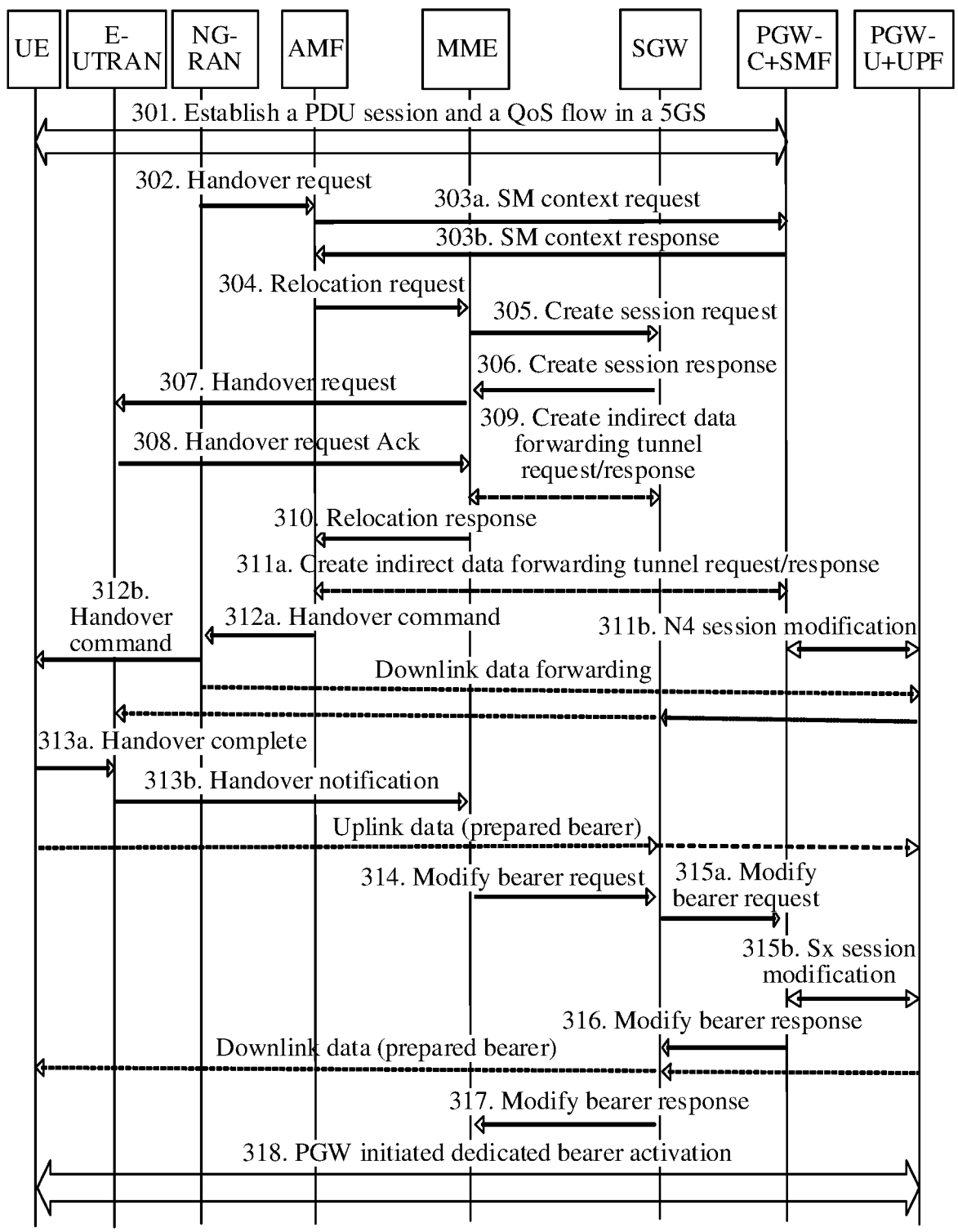
FIG. 4 is a schematic flowchart of a wireless communications method according to an embodiment of this application.

The technical solutions in the embodiments of this application are described clearly with reference to the accompanying drawings in the embodiments of this application below.

The technical solutions in the embodiments of this application may be applied to a 5G NR communications system.

FIG. 1 shows a wireless communications system 100 to which an embodiment of this application is applied. The wireless communications system 100 may include an access network device 120 and an access network device 130. The access network device 120 and the access network device 130 may be devices that communicate with a terminal device 110. The access network device 120 is used as an example for description. The access network device 120 may provide communication coverage for a specified geographic area and may communicate with a terminal device (for example, user equipment (UE)) located in the coverage.

Optionally, the access network device 120 may be an evolved Node B (eNB or eNodeB), for example, an Evolved Universal Mobile Telecommunications System (UMTS) Terrestrial Radio Access Network (E-UTRAN) device, in an LTE system.

Optionally, the access network device 130 may be a g node B (gNB) in an NG-RAN or an NR system, or a wireless controller in a Cloud Radio Access Network (CRAN), or the access network device may be a relay station, an access point, an in-vehicle device, a wearable device, a network device in a future evolved PLMN or the like.

The wireless communications system 100 further includes at least one terminal device 110 located within the coverage range of the access network device 120 and the access network device 130. The terminal device 110 may be mobile or fixed. Optionally, the terminal device 110 may be an access terminal, UE, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

The wireless communications system 100 further includes a core network device 140 that communicates with the access network device 120 and a core network device 150 that communicates with the access network device 130. Optionally, the core network device 140 may be an EPC device, for example, a Core Packet Gateway+Session Management Function (PGW-C+SMF) device, in an LTE network. Optionally, the core network device 150 may be a 5GC, for example, an Access and Mobility Management Function (AMF), or for another example, a Session Management Function (SMF).

The core network device 140 and the core network device 150 may communicate with each other through an N26 interface.

Optionally, when the terminal device 110 moves from a 5G network to a 4G network and an N26 interface exists between the core network device 140 and the core network device 150, an inter-system handover may be implemented through the N26 interface.

Optionally, when the terminal device 110 moves from a 5G network to a 4G network and an N26 interface exists between the core network device 140 and the core network device 150, an inter-system handover may be implemented through an Attach procedure in which a handover identifier (ID) is carried.

Optionally, in this embodiment of this application, the AMF and the SMF may exchange information. For example, the SMF obtains some pieces of information about a RAN side from the AMF.

FIG. 1 shows two access network devices, two core network devices, and one terminal device as an example. Optionally, the wireless communications system 100 may include a plurality of access network devices, and coverage of each access network device may include another quantity of terminal devices. This is not limited to this embodiment of this application.

Optionally, the wireless communications system 100 may further include other network entities such as a mobility management entity (MME), a UDM, an Authentication Server Function (AUSF), a User Plane Function (UPF), a signaling gateway (SGW), an HSS+UDM, and a Packet Gateway User (PGW-U). However, this is not limited in the embodiments of the present application.

It should be understood that the SMF+PGW-C may simultaneously implement the functions that can be implemented by the SMF and a PGW-C, and the HSS+UDM may simultaneously implement the functions that can be implemented by the HSS and the UDM.

It should be understood that terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

FIG. 2 is a schematic flowchart of a wireless communications method 200 according to an embodiment of this application. The method 200 includes at least a part of the following content.

In 210, a first network device in a first system determines a registration mode and/or a supported registration mode of a terminal device, and/or the support for interoperations with an N26 interface or without an N26 interface by the first system, where the registration mode is an SR mode of registration with a single system or a DR mode of registration with dual systems, and a first cell in the first system is accessed by the terminal device. Optionally, in this embodiment of this application, the first system and a second system may be systems in different communication protocol versions.

For example, the first system may be a 5GS, and the second system may be a 4G system (4GS). Alternatively, the first system may be a 4GS, and the second system may be a 5GS.

Optionally, the first network device may be a core network device, for example, an MME in a 4GS or an AMF in a 5GS or may be an access network device, for example, an E-UTRAN device in a 4GS or a RAN device in 5GS.

How the first network device determines the registration mode and/or the supported registration mode of the terminal device is described below.

In an implementation, the first network device receives first information sent by the terminal device, where the first information is used to indicate the registration mode and/or the supported registration mode of the terminal device.

Optionally, the first information is carried in a registration message or a location update message.

The terminal device may add the support for a registration mode and the registration mode of the terminal device during registration.

For example, as shown in FIG. 3, in 501, the terminal device may add the support for a registration mode and the registration mode of the terminal device to a registration request and sends the registration request to a RAN. In 502, the RAN may choose an AMF, and sends the registration request to a target AMF. In this way, the target AMF may obtain the support for a registration mode by the terminal device and the registration mode of the terminal device.

When the registration mode of the terminal device changes, the terminal device may trigger the location update message to notify a network side of the change of the registration mode.

Specifically, the terminal device may indicate the registration mode and/or the supported registration mode of the terminal device in the registration message or the location update message sent to the first network device. The terminal device may indicate whether the terminal device has registered with another system or indicate a quantity of systems with which the terminal device has registered to indicate the registration mode of the terminal device. For example, if the terminal device has registered with another system or the first system is the second one with which the terminal device has registered, the registration mode of the terminal device is a DR mode. Alternatively, if the terminal device has not registered with another system or the first system is the first one with which the terminal device has registered, the registration mode of the terminal device is an SR mode.

In an implementation, the first network device receives second information sent by a second network device, where the second information is used to indicate the registration mode of the terminal device.

Optionally, after the first cell is accessed by the terminal device, the first network device sends a subscription notification to the second network device, where the subscription notification is used to instruct the second network device to notify the first network device after the terminal device registers with the second system, and the second information is used to indicate that the mode of the terminal device is a DR mode by indicating that the terminal device has registered with the second system.

It should be understood that, in this embodiment of this application, the subscription notification may alternatively instruct to notify the first network device when the registration mode of the terminal device changes, for example, changes from an SR mode to a DR mode or changes from a DR mode to an SR mode. In this way, the second network device may send second information when the registration mode of the terminal device changes, where the second information is used to indicate the registration mode of the terminal device.

Optionally, if it is determined that the terminal device supports a DR mode, the first network device sends the subscription notification to the second network device.

Specifically, if the terminal device reports in initial registration that the terminal device does not support a DR mode, the network side may detect the parameter in a procedure that needs to be triggered subsequently, and the terminal device or the second network device does not need to notify the first network device of the change of the registration mode of the terminal device.

Optionally, the second network device is a network element UDM+HSS.

In an implementation, the first network device receives third information sent by a third network device in the first system, where the third information is used to indicate registration of the terminal device with the second system; and the first network device determines the registration mode of the terminal device according to the registration of the terminal device with the second system.

In this case, the first network device is an access network device in the first system, and the third network device is a core network device in the first system. For example, the first network device is an access network device in a 5GS, and the third network device is an AMF in a 5GS. Alternatively, the first network device is an access network device in a 4GS, and the third network device is an MME in a 4GS.

Optionally, the third information is a cause value in a handover request reject message, and the third information is used to indicate that the terminal device has registered with the second system.

Optionally, the first network device sends a handover request to the third network device, where the handover request is used by the third network device to send a relocation request to a core network device in the second system through an N26 interface.

For example, in a 5GS, after UE completes registration, an NG-RAN keeps processing the UE in an SR mode. That is, if an N26 interface is supported and a handover needs to be performed, a handover request message is normally sent to the AMF, and the AMF continues to send a relocation request to the MME (shown by 304 in FIG. 4). In this case, if the UE has registered with a 4GS, because the context of the UE exists on the MME, the MME cannot perform a subsequent procedure in FIG. 4. Therefore, the relocation request is rejected, a reject message is sent to the AMF, and the reject message includes a cause value that indicates "Rejected because the UE has registered." The AMF sends the reject message to the NG-RAN. The NG-RAN triggers an RRC redirection procedure according to the reject message and the cause value.

For example, in the 5GS, when the UE has registered with a 5GC and then successfully registers with an EPC system, an MME in the EPC system notifies, through the N26 interface, the peer AMF that the UE has registered with the system (that is, the UE is in a DR mode). Similarly, after the UE has deregistered from the EPC system, the MME may similarly notify, through the N26 interface, the peer AMF that the UE has registered.

In this manner, after receiving a message indicating that the UE has registered with the EPC system, the AMF may notify the NG-RAN in advance through an N2 interface or may use a reject message to notify the NG-RAN when the NG-RAN triggers a handover request.

An example in which the first system is a 4GS, and the second system is a 5GS has been described above. However, this embodiment of this application is not limited thereto. The first system may be a 5GS, and the second system is a 4GS.

In 220, the first network device determines, according to the registration mode and/or the supported registration mode of the terminal device, and/or the support for interoperations with an N26 interface or without an N26 interface by the first system, a procedure that needs to be performed or cannot be performed for the terminal device to access a second cell in the second system.

Optionally, the procedure may be a redirection procedure, a handover procedure or a procedure for the terminal device to access the second cell while keeping the first cell being accessed by the terminal device.

Optionally, the redirection procedure discussed herein may be releasing the access to the first cell and establishing an access to the second cell.

In an implementation, when the first system supports interoperations with an N26 interface, the procedure that needs to be performed is a handover procedure.

In an implementation, when the first system supports interoperations without an N26 interface and/or the registration mode of the terminal device is a DR mode, the procedure that needs to be performed is a redirection procedure.

In an implementation, when the registration mode of the terminal device is an SR mode, the procedure that is determined by the first network device and needs to be performed is a handover procedure or a redirection procedure.

Optionally, when the registration mode of the terminal device is an SR mode, the terminal device keeps a connected state with the first cell, and an N26 interface is supported between the first system and the second system, the procedure that needs to be performed is a handover procedure.

Alternatively, when the registration mode of the terminal device is an SR mode, the terminal device keeps a connected state with the first cell, and the first system supports interoperations with an N26 interface, the procedure that needs to be performed is a handover procedure.

The handover procedure is described below with reference to FIG. 4. The handover procedure shown in FIG. 4 is a handover from a 5GS to a 4GS. However, it should be understood that this embodiment of this application is not limited thereto. The handover in this embodiment of this application may be alternatively a handover from a 4GS to a 5GS.

In 301, establish a protocol data unit (PDU) session and a quality of service (QoS) flow in a 5GS.

In 302, an NG-RAN sends a handover request to an AMF.

In 303*a*, the AMF sends a service message (SM) context request to a PGW-C+SMF.

In 303*b*, the PGW-C+SMF sends an SM context response to the AMF.

In 304, the AMF sends a relocation request to an MME.

In 305, the MME sends a create session request to an SGW.

In 306, the SGW sends a create session response to the MME.

In 307, the MME sends a handover request to an E-UTRAN.

In 308, the E-UTRAN sends a handover request acknowledgement (Ack) to the MME.

In 309, send a create indirect data forwarding tunnel request/response between the MME and the SGW.

In 310, the MME sends a relocation response to the AMF.

In 311*a*, send the create indirect data forwarding tunnel request/response between the AMF and the PGW-C+SMF.

In 311*b*, the PGW-C+SMF and a PGW-U+UPF perform N4 session modification.

In 312*a*, the AMF sends a handover command to the NG-RAN.

In 312*b*, the E-UTRAN sends a handover command to UE.

In 313*a*, the UE sends a handover complete message to the E-UTRAN.

In 313*b*, the E-UTRAN sends a handover notification to the MME.

In 314, the MME sends a modify bearer request to the SGW.

In 315*a*, the SGW sends the modify bearer request to the PGW-C+SMF.

In 315*b*, the PGW-C+SMF and the PGW-U+UPF perform Sx session modification.

In 316, the PGW-C+SMF sends a modify bearer response to the SGW.

In 317, the SGW sends the modify bearer response to the MME.

In 318, the devices perform PGW initiated dedicated bearer activation.

Optionally, when the registration mode of the terminal device is an SR mode and the first system and the second system do not support an N26 interface, the procedure that needs to be performed is a redirection procedure.

Alternatively, when the registration mode of the terminal device is an SR mode, and the first system supports interoperations without an N26 interface, the procedure that needs to be performed is a redirection procedure.

It should be understood that, in this embodiment of this application, the support for interoperations with an N26 interface by the first system or the second system may be understood as the support for a handover with an N26 interface or the like.

In addition, in this embodiment of this application, the support for interoperations without an N26 interface by the first system or the second system may be understood as the support for a handover without an N26 interface, or the like.

Optionally, in this embodiment of this application, the support for interoperations with an N26 interface or the support for interoperations without an N26 interface by the first system or the second system may be the support for interoperations with an N26 interface or the support for interoperations without an N26 interface by a core network device in the first system or a core network device in the second system.

Optionally, in this embodiment of this application, the support for an N26 interface by the system may be understood as the support for interoperations with an N26 interface.

Optionally, in this embodiment of this application, the redirection procedure may be that the terminal device releases an access to the first cell and establishes an access to the second cell. The operations after the redirection procedure are performed may be shown in FIG. 5.

Figure 5:
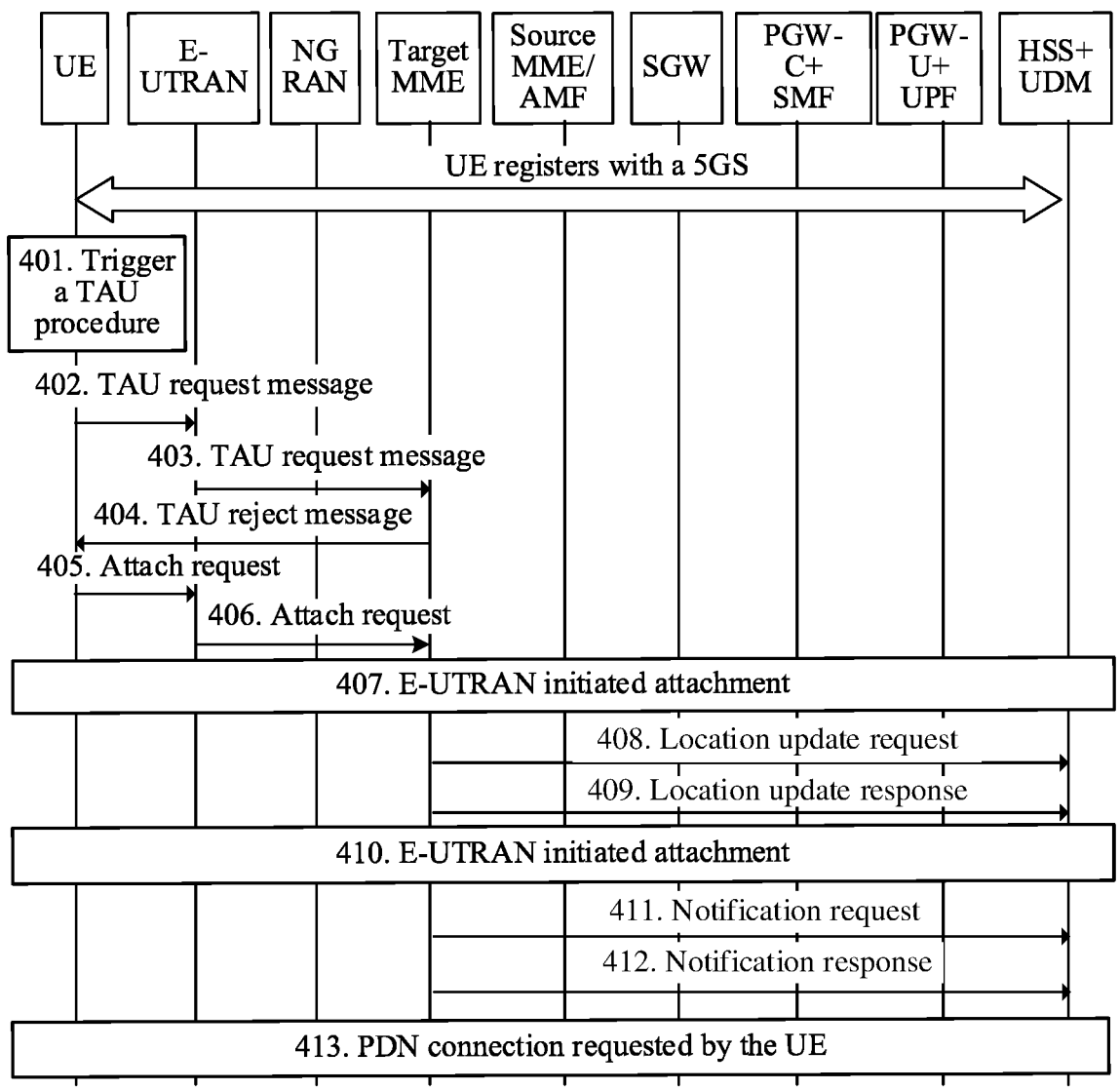
FIG. 5 is a schematic flowchart of a wireless communications method according to an embodiment of this application.

It should be understood that the procedure shown in FIG. 5 may also be used as at least some operations of the redirection procedure.

It should also be understood that the procedure shown in FIG. 5 may be a network handover from a 5GS to a 4GS. However, it should be understood that this embodiment of this application is not limited thereto. In this embodiment of this application, a handover from a 4GS to a 5GS may be alternatively implemented.

For example, UE moves from the coverage of a 5G NR network to the coverage of a 4G LTE network. In this case, the UE needs to access the 4G LTE network from the 5G NR network.

For another example, UE is in both the coverage of a 5G NR network and the coverage of a 4G LTE network. In this case, the UE abandons the access to the 5G NR network and chooses to access the 4G LTE network.

In 401, the UE triggers a TAU procedure, which may also be referred to as a location update procedure.

It should be understood that the UE completes registration with the 5GS, so that an NG-RAN (gNB), a source MME/AMF, a PGW-C+SMF, and a PGW-U+UPF serve the UE.

In 402, the UE sends a TAU request message to an E-UTRAN (eNB).

Optionally, the TAU request message includes Globally Unique Temporary UE Identity (GUTI) information. The GUTI information instructs the UE to access the 4G LTE network from the 5G NR network.

In 403, the E-UTRAN sends the TAU request message to a target MME.

It should be understood that the target MME is a core network element that serves the UE after the UE moves to a 4G network.

In 404, the target MME sends a TAU reject message to the UE.

The TAU reject message is a response message for the TAU request message.

Optionally, after failing to parse the GUTI information carried in the TAU request message, the target MME sends the TAU reject message to the UE.

Optionally, the TAU reject message includes a cause value. The cause value indicates that the target MME cannot recognize the GUTI information and/or the target MME does not support communication without an inter-system interface. Optionally, the UE triggers, according to the cause value, to send an attach request to the target MME (forwarding by the E-UTRAN).

Optionally, the TAU reject message includes indication information, where the indication information is used to trigger the UE to send an attach request to the target MME (forwarding by the E-UTRAN).

In 405, the UE sends an attach request carrying a handover ID to the E-UTRAN.

Optionally, a Packet Data Network (PDN) connectivity request parameter in the attach request carries the handover ID.

Optionally, the attach request may carry a native GUTI of a terminal device and an indication indicating that the terminal device moves from 5G to 4G.

Optionally, the attach request includes an Access Point Name (APN) or a destination network name (DNN) corresponding to a PDU/PDN session in the 5G NR network.

In 406, the E-UTRAN sends the attach request to the target MME.

Optionally, the target MME determines, according to the GUTI information included in the TAU request message, that the UE accesses 4G LTE network from the 5G NR network.

In 407, perform E-UTRAN initiated attachment.

In 408, the target MME sends a location update request to an HSS+UDM.

In 409, the HSS+UDM sends a location update response to the target MME.

In 410, perform E-UTRAN initiated attachment.

In 411, the target MME sends a notification request to the HSS+UDM.

In 412, the HSS+UDM sends a notification response to the target MME.

In 413, establish a PDN connection requested by the UE.

Optionally, when the registration mode of the terminal device is an SR mode, if the terminal device recognizes indication information that is sent by a network side and is used to indicate that the network side supports a handover without an N26 interface, the terminal device sends an attach request message to the network side after performing a triggered redirection procedure. That is, the execution starts from 405.

Optionally, when the registration mode of the terminal device is an SR mode, if the terminal device does not recognize indication or does not receive information that is sent by a network side and is used to indicate that the network side supports a handover without an N26 interface, the terminal device sends a location update TAU request message after performing a triggered redirection procedure. That is, the execution starts from 401.

When the execution starts from 401, if the UE may recognize the indication "a handover with an N26 interface is supported" sent from the network side, the UE executes an Attach with Handover flag, and an APN/DNN corresponding to a PDU session in the 5GS is carried. The message triggers the network side to search for integrated network elements SMF+PGW-C, UPF+PGW-U, and PCF+PCRF according to the APN/DNN used by the UE, so that the integrated network elements map the SM context of 4G, to implement the consistency of Internet Protocol (IP) addresses of sessions.

In an implementation, when the registration mode of the terminal device is an SR mode, and the supported registration mode of the terminal device is a DR mode, the procedure that needs to be performed is a procedure for the terminal device to access the second cell while keeping the first cell being accessed by the terminal device. Specifically, the terminal device may establish a new attachment and PDN connection. A network device may trigger, through an RRC reconfiguration message, the terminal device to access the second cell while keeping the access.

In an implementation, when the registration mode of the terminal device is a DR mode, the procedure that needs to be performed is a redirection procedure. Specifically, the terminal device may release the access to the first cell in the first system and establish an access to the second cell in the second system.

In the implementation, the first system and the second system support an N26 interface.

That is, even if the first system and the second system support an N26 interface, if the registration mode of the terminal device is a DR mode, the terminal device may perform a redirection procedure, and send an attach request after performing the redirection procedure. That is, the execution may start from 405 in FIG. 4.

Specifically, if the UE does not recognize the indication "a handover with an N26 interface is supported" sent from the network side but instead makes a TAU request, in this case, provided that the network side does not support an N26 interface, the network side sends the TAU reject message to the UE, and the UE then initiates a normal Attach procedure. In this case, the consistency of IP addresses of sessions may fail to be ensured.

An example in which the first network device is a core network device is used for the description below.

Optionally, the core network device receives a handover request triggered by the access network device in the first system, where the handover request is used to request to switch a cell accessed by the terminal device; and in response to a handover procedure, the core network device determines, based on the registration mode and/or the supported registration mode of the terminal device, and/or the support for interoperations with an N26 interface or without an N26 interface by the first system, the procedure that needs to be performed or cannot be performed for the terminal device to access the second cell in the second system.

Optionally, if the core network device determines that the terminal device accesses the second cell and cannot perform a handover procedure, the core network device sends a handover reject message to the access network device.

Optionally, the handover reject message carries a cause value of rejecting the handover request message.

Optionally, the handover reject message carries the registration mode and the supported registration mode of the terminal device and the procedure that needs to be performed. Specifically, the registration mode of the terminal device may be reported to the AMF through a non-access stratum (NAS) message and stored on the AMF. When the NG-RAN triggers a handover request command, the AMF makes a choice according to the registration mode of the terminal device. In the case of an SR mode, the AMF continues to perform a subsequent procedure of the handover. In the case of a DR mode, the AMF rejects the handover request message and sends the handover reject message to the NG-RAN. It is indicated in the cause value that the UE is in a DR mode or that the UE cannot perform a handover procedure. After being rejected, the NG-RAN triggers RRC redirection according to the cause value sent by the AMF.

An example in which the first network device is an access network device is used for the description below. Optionally, when the procedure that needs to be performed is a handover procedure, the access network device triggers a handover request message to the core network device in the first system; and when the procedure that needs to be performed is an attach procedure or a redirection procedure, the access network device triggers, to the terminal device, the procedure for the terminal device to access the second cell while keeping the first cell being accessed by the terminal device or the redirection procedure.

Optionally, the registration mode of the terminal device, and/or the support for a DR mode by the terminal device may be reported to the NG-RAN through an air interface message or sent to the NG-RAN through an N2 interface by the AMF and stored on the NG-RAN. The NG-RAN determines, according to the registration mode of the terminal device, and/or the support for a DR mode by the terminal device, to initiate a handover request or RRC redirection.

Optionally, in this embodiment of this application, the access network device sends a handover request message to the core network device; and the access network device receives a handover reject message, where the handover reject message carries indication information, and the indication information is used to indicate that the first system supports interoperations without an N26 interface and/or the terminal device is in a DR mode, so that the access network device may trigger RRC redirection according to the indication information.

Optionally, in this embodiment of this application, the support for interoperations with an N26 interface or without an N26 interface by the first system is determined by the access network device based on preset information.

Optionally, the preset information is an N2 message sent by the core network device in the first system.

Optionally, the preset information is a message returned by the core network device in the first system for a registration message of the terminal device or another terminal device.

Specifically, the message sent by the AMF to the NG-RAN carries an ID indicating "the network side supports interoperations without an N26 interface and/or the UE is in a DR mode." Subsequently, the NG-RAN may trigger an RRC redirection operation according to this indication when inter-system interoperations are required. This message may be added to a reply message (including an N2 message and a NAS message) during registration.

Figure 6:
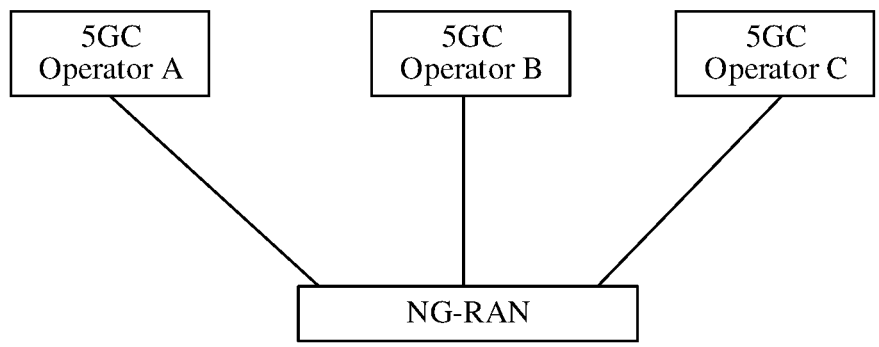
FIG. 6 is a schematic diagram showing that a Next Generation (NG)-Radio Access Network (RAN) is connected to 5GCs of a plurality of operators according to an embodiment of this application.

Optionally, as shown in FIG. 6, core network devices of a plurality of operators may access one same NR-RAN. Therefore, the support for interoperations with an N26 interface by 5GCs of the plurality of operators may be present on the same NR-RAN.

Optionally, the preset information includes the support for interoperations with an N26 interface or without an N26 interface by a system corresponding to at least one PLMN. Details may be shown in the following Table 1.

TABLE 1

| PLMN-1 | Supports interoperations with an N26 interface |
| PLMN-2 | Supports interoperations without an N26 interface |
| ... | |
| PLMN-n | Supports interoperations without an N26 interface |

Specifically, one PLMN list may be configured on the NG-RAN to indicate whether a system (or referred to as a network) corresponding to each PLMN supports interoperations with an N26 interface. The NG-RAN determines, according to the list, the support for interoperations with an N26 interface corresponding to a PLMN accessed by the UE, to determine whether to trigger RRC redirection or a handover request.

The support for interoperations with an N26 interface or without an N26 interface by the system corresponding to at least one PLMN may be configured by the core network device for the access network device.

For example, as shown in FIG. 7, the core network device may indicate, to a plurality of RANs, whether at least one system supports interoperations with an N26 interface, which may be indicated based on the granularity of a PLMN ID list.

It should be understood that, in this embodiment of this application, the foregoing description is provided by using an example in which the first system is a 5GS, and the second system is a 4GS. However, it should be understood that this embodiment of this application is not limited thereto.

FIG. 8 is a schematic flowchart of a wireless communications method 600 according to an embodiment of this application. The method 600 includes at least a part of the following content.

In 610, a second network device determines at least one of a registration mode and a supported registration mode of a terminal device, the support for interoperations with an N26 interface or without an N26 interface by a first system, the support for interoperations with an N26 interface or without an N26 interface by a system corresponding to at least one PLMN, and registration of the terminal device with a second system.

In 620, the second network device sends indication information to a first network device in the first system, where the indication information is used to indicate at least one of the registration mode and the supported registration mode of the terminal device, the support for interoperations with an N26 interface or without an N26 interface by the first system, the support for interoperations with an N26 interface or without an N26 interface by the system corresponding to at least one PLMN, and the registration of the terminal device with the second system.

Optionally, the second network device determines, based on a registration message or a location update message sent by the terminal device, the at least one of the registration mode and the supported registration mode of the terminal device and the registration of the terminal device with the second system.

Optionally, the second network device receives a subscription notification sent the first network device in the first system, where the subscription notification is used to instruct the second network device to notify the first network device after the terminal device registers with the second system, the terminal device has registered with the first system, and the indication information is used to indicate that the mode of the terminal device is a DR mode by indicating that the terminal device has registered with the second system.

Optionally, the second network device is a network element UDM+HSS.

Optionally, the second network device is a core network device in the second system, and the first network device is a core network device in the first system; and the indication information is used to indicate that the terminal device has registered with or deregistered from the second system.

Optionally, the second network device is a core network device in the first system, and the first network device is an access network device in the first system.

Optionally, the second network device receives information that is sent by the core network device in the second system and is used to indicate registration of the terminal device with the second system.

Optionally, in this embodiment of this application, the second network device receives a handover request message sent by the first network device.

Optionally, in this embodiment of this application, when the first system supports interoperations without an N26 interface and/or the terminal device is in a DR mode, the second network device sends a handover reject message to the first network device, where first indication information is carried in the handover reject message, and the first indication information is used to indicate that the first system supports interoperations without an N26 interface and/or the terminal device is in a DR mode.

FIG. 9 is a schematic flowchart of a wireless communications method 700 according to an embodiment of this application. The method 700 includes at least a part of the following content.

In 710, a terminal device generates first information, where the first information is used to indicate a registration mode and/or a supported registration mode of the terminal device.

In 720, the terminal device sends the first information to a network device, where the first information is used to indicate the registration mode and/or the supported registration mode of the terminal device.

Optionally, the first information is carried in a registration message or a location update message.

It should be understood that the methods in the embodiments of this application may be combined in some cases. For brevity, details are not described herein again.

FIG. 10 is a schematic flowchart of a wireless communications method 1300 according to an embodiment of this application. The method 1300 includes at least a part of the following content.

In 1310, a terminal device receives indication information sent by a network device, where the indication information is used to indicate the support for interoperations with an N26 interface or without an N26 interface by a system corresponding to at least one PLMN.

In 1320, choose, based on the support for interoperations with an N26 interface or without an N26 interface by the system corresponding to the at least one PLMN, a PLMN for access.

FIG. 11 is a schematic flowchart of a wireless communications method 1400 according to an embodiment of this application. The method 1400 includes at least a part of the following content.

In 1410, a network device obtains the support for interoperations with an N26 interface or without an N26 interface by a system corresponding to at least one PLMN.

In 1420, the network device sends indication information to a terminal device, where the indication information is used to indicate the support for interoperations with an N26 interface or without an N26 interface by the system corresponding to the at least one PLMN.

Optionally, in this embodiment of this application, the network device may be a core network device.

FIG. 12 is a schematic block diagram of a wireless communications method 1500 according to an embodiment of this application. The method 1500 includes at least a part of the following content.

In 1510, an access network device sends a handover request message for a terminal device to a source core network device.

In 1520, the access network device receives a handover reject message sent by the core network device.

In 1530, in response to the handover reject message, the access network device triggers an RRC redirection operation for the terminal device.

Specifically, as shown in FIG. 13, a source RAN (S-RAN) sends a handover request message to the core network device. After receiving the handover request message, the core network device sends a handover reject message to the S-RAN. After receiving the handover reject message, the S-RAN triggers RRC redirection to UE. The UE may send an RRC connection request to a target RAN (T-RAN).

FIG. 14 is a schematic block diagram of a network device 800 according to an embodiment of this application. As shown in FIG. 14, the network device 800 includes a first determining unit 810 and a second determining unit 820.

The first determining unit 810 is configured to determine a registration mode and/or a supported registration mode of a terminal device, where the registration mode is an SR mode of registration with a single system or a DR mode of registration with dual systems, and a first cell in the first system is accessed by the terminal device; and The second determining unit 820 is configured to determine, according to the registration mode and/or the supported registration mode of the terminal device, a procedure that needs to be performed or cannot be performed for the terminal device to access a second cell in a second system.

Optionally, the network device may further include a communications unit 830, configured to communicate with another network device or terminal device.

It should be understood that the network device 800 in this embodiment of this application may implement corresponding operations of the first network device in the method embodiments. For brevity, details are not described herein again.

FIG. 15 is a schematic block diagram of a network device 900 according to an embodiment of this application. As shown in FIG. 15, the network device 900 includes a determining unit 910 and a communications unit 920.

The determining unit 910 is configured to determine at least one of a registration mode and a supported registration mode of a terminal device and registration of the terminal device with a second system.

The communications unit 920 is configured to send indication information to a first network device in the first system, where the indication information is used to indicate the at least one of the registration mode and the supported registration mode of the terminal device and the registration of the terminal device with the second system.

It should be understood that the network device 900 in this embodiment of this application may implement corresponding operations of the second network device in the method embodiments. For brevity, details are not described herein again.

Figure 16:
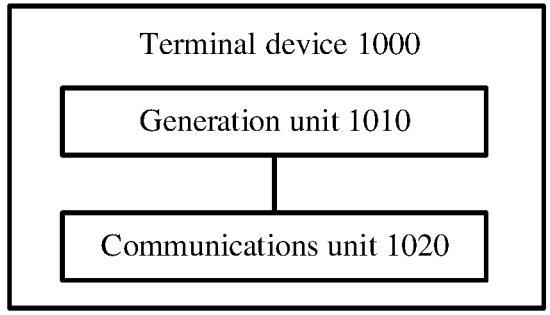
FIG. 16 is a schematic block diagram of a terminal device according to an embodiment of this application.

FIG. 16 is a schematic block diagram of a terminal device 1000 according to an embodiment of this application. As shown in FIG. 16, the terminal device 1000 includes a generation unit 1010 and a communications unit 1020.

The generation unit 1010 is configured to generate indication information, where the indication information is used to indicate a registration mode and/or a supported registration mode of the terminal device.

The communications unit is configured to send the indication information to a network device, where the indication information is used to indicate the registration mode and/or the supported registration mode of the terminal device.

It should be understood that the terminal device 1000 in this embodiment of this application may implement corresponding operations of the terminal device in the method embodiments. For brevity, details are not described herein again.

Figure 17:
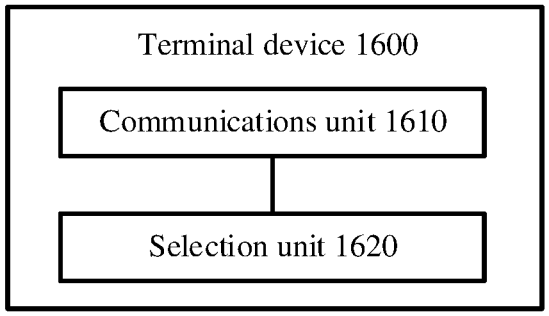
FIG. 17 is a schematic block diagram of a terminal device according to an embodiment of this application.

FIG. 17 is a schematic block diagram of a terminal device 1600 according to an embodiment of this application. The terminal device 1600 includes a communications unit 1610 and a selection unit 1620.

The communications unit 1610 is configured to receive indication information sent by a network device, where the indication information is used to indicate the support for interoperations with an N26 interface or without an N26 interface by a system corresponding to at least one PLMN.

The selection unit 1620 is configured to choose, based on the support for interoperations with an N26 interface or without an N26 interface by the system corresponding to the at least one PLMN, a PLMN for access.

Figure 18:
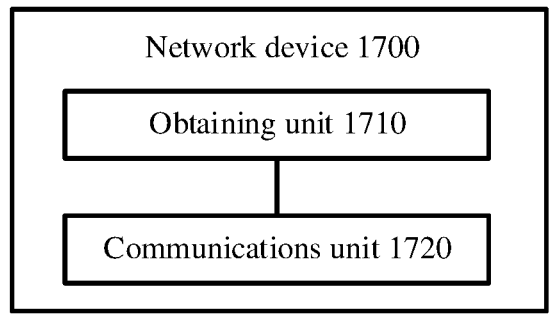
FIG. 18 is a schematic block diagram of a network device according to an embodiment of this application.

FIG. 18 is a schematic block diagram of a network device 1700 according to an embodiment of this application. The network device 1700 includes an obtaining unit 1710 and a communications unit 1720.

The obtaining unit 1710 is configured to obtain the support for interoperations with an N26 interface or without an N26 interface by a system corresponding to at least one PLMN.

The communications unit 1720 is configured to send indication information to a terminal device, where the indication information is used to indicate the support for interoperations with an N26 interface or without an N26 interface by the system corresponding to the at least one PLMN.

Figure 19:
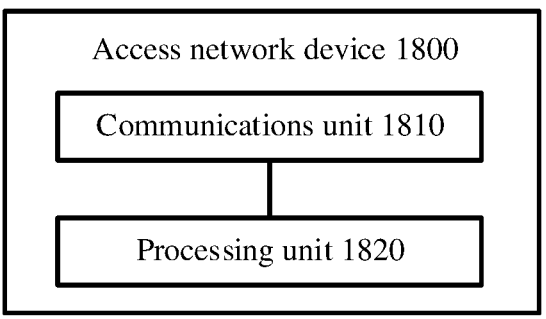
FIG. 19 is a schematic block diagram of an access network device according to an embodiment of this application.

FIG. 19 is a schematic block diagram of an access network device 1800 according to an embodiment of this application. The access network device 1800 includes a communications unit 1810 and a processing unit 1820.

The communications unit 1810 is configured to: send a handover request message for a terminal device to a source core network device, and receive a handover reject message sent by the source core network device.

The processing unit 1820 is configured to, in response to the handover reject message, trigger an RRC redirection operation for the terminal device.

Figure 20:
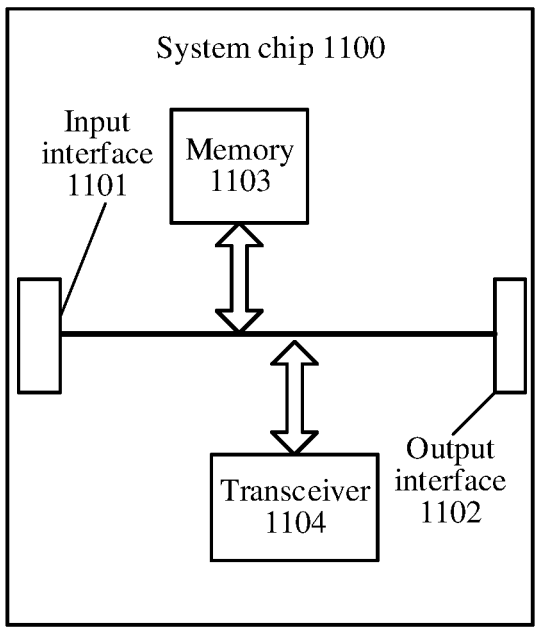
FIG. 20 is a schematic block diagram of a system chip according to an embodiment of this application.

FIG. 20 is a schematic structural diagram of a system chip 1100 according to an embodiment of this application. The system chip 1100 in FIG. 20 includes an input interface 1101, an output interface 1102, a processor 1103, and a memory 1104 that may be connected to each other by using an internal communications connection line, and the processor 1103 is configured to execute code in the memory 1104.

Optionally, when the code is executed, the processor 1103 implements the method performed by the terminal device in the method embodiments. For brevity, details are not described herein again.

Optionally, when the code is executed, the processor 1103 implements the method performed by the first network device in the method embodiments. For brevity, details are not described herein again.

Optionally, when the code is executed, the processor 1103 implements the method performed by the second network device in the method embodiments. For brevity, details are not described herein again.

Figure 21:
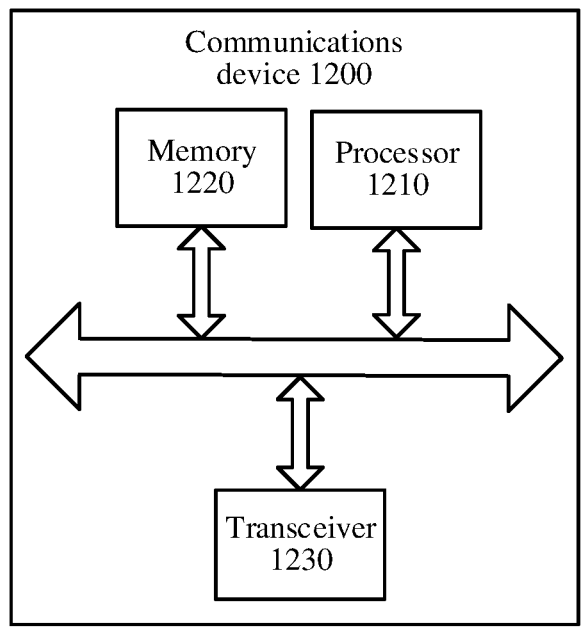
FIG. 21 is a schematic block diagram of a communications device according to an embodiment of this application.

FIG. 21 is a schematic block diagram of a communications device 1200 according to an embodiment of this application. As shown in FIG. 21, the communications device 1200 includes a processor 1210 and a memory 1220. The memory 1220 may store program code, and the processor 1210 may execute the program code stored in the memory 1220.

Optionally, as shown in FIG. 21, the communications device 1200 may include a transceiver 1230, and the processor 1210 may control the transceiver 1230 to communicate with the outside.

Optionally, the processor 1210 may invoke program code stored in the memory 1220 to perform corresponding operations of the terminal device in the method embodiments. For brevity, details are not described herein again.

Optionally, the processor 1210 may invoke program code stored in the memory 1220 to perform corresponding operations of the network device in the method embodiments. For brevity, details are not described herein again.

It should be understood that the processor of this embodiment of this application may be an integrated circuit chip and has a signal processing capability. During implementation, the steps of the foregoing method embodiments may be implemented by using a hardware integrated logic circuit in the processor or implemented by using an instruction in a software form. The foregoing processor may be a general-purpose processor, a digital signal processor (DSP), an application-specific integrated circuit (ASIC), a field-programmable gate array (FPGA), or another programmable logical device, discrete gate or transistor logical device, or discrete hardware component. The processor may implement or perform the methods, steps, and logical block diagrams disclosed in the embodiments of this application. The general-purpose processor may be a microprocessor, or the processor may be any regular processor or the like. Steps of the methods disclosed with reference to the embodiments of this application may be directly executed and completed by means of a hardware decoding processor or may be executed and completed by using a combination of hardware and software modules in the decoding processor. The software module may be located in a mature storage medium in the field, such as a random access memory (RAM), a flash memory, a read-only memory (ROM), a programmable ROM (PROM), an electrically-erasable programmable memory, or a register. The storage medium is located in the memory, and the processor reads information in the memory and completes the steps in the foregoing methods in combination with hardware of the processor.

It can be understood that the memory in the embodiments of this application may be a volatile memory or a non-volatile memory or may include both a volatile memory and a non-volatile memory. The non-volatile memory may be a ROM, a PROM, an erasable PROM (EPROM), an electrically EPROM (EEPROM) or a flash memory. The volatile memory may be a RAM and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory for the system and the methods described herein aims to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program codes, such as a Universal Serial Bus (USB) flash disk, a removable hard disk, a ROM, a RAM, a magnetic disk, or an optical disc.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network device, comprising:
a memory storing code; and
a processor connected to the memory and, when the code is executed, configured to:
   determine at least one of a registration mode of a terminal device, a supported registration mode of the terminal device, a support for interworking with an N26 interface by a first system, or a support for interworking without an N26 interface by the first system, wherein the registration mode is a single registration (SR) mode of registration with a single system or a dual registration (DR) mode of registration with dual systems, and a first cell in the first system is accessed by the terminal device;
   determine, according to the determined at least one of the registration mode of the terminal device, the supported registration mode of the terminal device, the support for interworking with an N26 interface by the first system, or the support for interworking without an N26 interface by the first system, an allowed procedure for the terminal device to access a second cell in a second system; and
   make the terminal device to perform the allowed procedure to establish an access to the second cell,
   wherein in response to the registration mode of the terminal device being an SR mode, the determined procedure is a handover procedure or a redirection procedure,
   wherein in response to the terminal device keeping a connected state with the first cell, and the first system not supporting interworking with an N26 interface, the determined procedure is the redirection procedure,
   wherein the network device is an access network device, and
   wherein the processor is configured to determine at least one of the support for interworking with an N26 interface by the first system or the support for interworking without an N26 interface by the first system based on preset information.

2. The network device according to claim 1, wherein the processor is further configured to cause the network device to receive first information sent by the terminal device, indicative of at least one of the registration mode or the supported registration mode of the terminal device.

3. The network device according to claim 2, wherein the first information is carried in a registration message or a location update message.

4. The network device according to claim 1, wherein the processor is further configured to cause the network device to receive second information sent by a second network device indicative of the registration mode of the terminal device.

5. The network device according to claim 4, wherein the processor is further configured to after the first cell is accessed by the terminal device, cause the network device to send a subscription notification to the second network device,
   wherein the subscription notification instructs the second network device to notify the network device after the terminal device registers with the second system, and
   the second information indicates that the registration mode of the terminal device is a DR mode by indicating that the terminal device has registered with the second system.

6. The network device according to claim 5, wherein to cause the network device to send the subscription notification to the second network device, the processor is further configured to in response to the supported registration mode of the terminal device being a DR mode, cause the network device to send the subscription notification to the second network device.

7. The network device according to claim 1, wherein the processor is further configured to:
    cause the network device to receive third information sent by a third network device in the first system indicative of registration of the terminal device with the second system; and
    determine the registration mode of the terminal device according to the registration of the terminal device with the second system.

8. The network device according to claim 7, wherein the network device is an access network device in the first system, and the third network device is a core network device in the first system; and
    the third information is a cause value in a handover request reject message, and the third information indicates that the terminal device has registered with the second system.

9. The network device according to claim 8, wherein the processor is further configured to cause the network device to send a handover request to the third network device to allow the third network device to send a redirection request to a core network device in the second system through an N26 interface.

10. The network device according to claim 1, wherein in response to the terminal device keeping a connected state with the first cell, and the first system supporting interworking with an N26 interface, the determined procedure is a handover procedure.

11. The network device according to claim 1, wherein in response to the terminal device keeping a connected state with the first cell, and the first system supporting interworking without an N26 interface, the determined procedure is a redirection procedure.

12. The network device according to claim 1, wherein in response to the registration mode of the terminal device being a DR mode, the determined procedure is a redirection procedure.

13. The network device according to claim 1, wherein in response to at least one of the first system supporting interworking without an N26 interface or the registration mode of the terminal device being a DR mode, the determined procedure is a redirection procedure.

14. The network device according to claim 1, wherein the processor is further configured to in response to the determined procedure being a handover procedure, trigger sending a handover request message to a core network device in the first system.

15. The network device according to claim 1, wherein the processor is further configured to, in response to the determined procedure being a redirection procedure, trigger the terminal device to access the second cell while keeping accessing the first cell.

16. The network device according to claim 1, wherein the preset information comprises at least one of an N2 message sent by a core network device in the first system, a message returned by the core network device in the first system for a registration message of the terminal device or another terminal device, a support for interworking with an N26 interface by a system corresponding to at least one Public Land Mobile Network (PLMN), or a support without an N26 interface by the system corresponding to at least one PLMN.

17. The network device according to claim 1, wherein the first system is a 5th generation system (5GS), and the second system is a Long Term Evolution (LTE) system.

18. The network device according to claim 1, wherein the supported registration mode of the terminal device is the DR mode, and the processor is further configured to cause the network device to receive an attach request messaged with a handover indication.

19. A terminal device, comprising:
    a memory storing code; and
    a processor connected to the memory and, when the code is executed, configured to:
      cause the terminal device to access a first cell in a first system;
      generate first information indicative of whether the terminal device supports sending an attach request message with a handover indication to a network device;
      cause the terminal device to send the first information to the network device in the first system; and
      perform a procedure determined by the network device in the first system to cause the terminal device to establish an access to a second cell in a second system,
    wherein in response to a registration mode of the terminal device being an SR mode, the determined procedure is a handover procedure or a redirection procedure,
    wherein in response to the terminal device keeping a connected state with the first cell, and the first system not supporting interworking with an N26 interface, the determined procedure is the redirection procedure,
    wherein the network device is an access network device, and
    wherein the processor is configured to determine at least one of the support for interworking with an N26 interface by the first system or the support for interworking without an N26 interface by the first system based on preset information.

20. The terminal device according to claim 19, wherein the first information is carried in a registration message or a location update message.

21. The terminal device according to claim 19, wherein the procedure determined by the network device is a redirection procedure.

22. The terminal device according to claim 21, wherein the processor is further configured to:
    recognize indication information from the network device indicative of a support of a handover without an N26 interface; and
    in response to recognizing the indication information, cause the terminal device to send the attach request message to the network device after performing the redirection procedure.

23. The terminal device according to claim 21, wherein the first information indicates that a registration mode of the terminal device is a dual registration (DR) mode, and the processor is further configured to cause the terminal device to send the attach request message to the network device after performing the redirection procedure.

24. The terminal device according to claim 21, wherein the attach request message comprises a Packet Data Network (PDN) connectivity request parameter carrying the handover indication.

25. A method for wireless communication, comprising:
    determining, by a first network device in a first system, at least one of a registration mode of a terminal device, a supported registration mode of the terminal device, a support for interworking with an N26 interface by a first system, or a support for interworking without an N26 interface by the first system, wherein the registration mode is a single registration (SR) mode of registration with a single system or a dual registration (DR) mode of registration with dual systems, and a first cell in the first system is accessed by the terminal device;

determining, by the first network device, according to the determined at least one of the registration mode of the terminal device, the supported registration mode of the terminal device, the support for interworking with an N26 interface by the first system, or the support for interworking without an N26 interface by the first system, an allowed procedure for the terminal device to access a second cell in a second system; and making, by the first network device, the terminal device to perform the allowed procedure to establish an access to the second cell, wherein in response to the registration mode of the terminal device being an SR mode, the determined procedure is a handover procedure or a redirection procedure, wherein in response to the terminal device keeping a connected state with the first cell, and the first system not supporting interworking with an N26 interface, the determined procedure is the redirection procedure, wherein the network device is an access network device, and wherein the processor is configured to determine at least one of the support for interworking with an N26 interface by the first system or the support for interworking without an N26 interface by the first system based on preset information.

26. A method for wireless communication, comprising:

accessing, by a terminal device, a first cell in a first system;

generating, by the terminal device, first information indicative of whether the terminal device supports sending an attach request message with a handover indication to a network device;

sending, by the terminal device, the first information to the network device in the first system; and performing, by the terminal device, a procedure determined by the network device in the first system to establish an access to a second cell in a second system, wherein in response to a registration mode of the terminal device being an SR mode, the determined procedure is a handover procedure or a redirection procedure, wherein in response to the terminal device keeping a connected state with the first cell, and the first system not supporting interworking with an N26 interface, the determined procedure is the redirection procedure, wherein the network device is an access network device, and wherein the processor is configured to determine at least one of the support for interworking with an N26 interface by the first system or the support for interworking without an N26 interface by the first system based on preset information.

* * * * *